United States Patent [19]

Agatsuma et al.

[11] Patent Number: 4,568,900

[45] Date of Patent: Feb. 4, 1986

[54] FORCED-COOLED SUPERCONDUCTOR

[75] Inventors: Ko Agatsuma, Akishima; Katsuyuki Kaiho, Kashiwa; Kenichi Koyama, Abiko; Osamu Kohno, Chiba; Yoshimitsu Ikeno; Nobuyuki Sadakata, both of Tokyo; Shigeo Shihyakugari, Funabashi; Tetsuo Yamaguchi, Yokohama, all of Japan

[73] Assignees: Agency of Industrial Science and Technology; Fujikura, Ltd., both of Tokyo, Japan

[21] Appl. No.: 551,689

[22] Filed: Nov. 14, 1983

[30] Foreign Application Priority Data

Nov. 16, 1982 [JP] Japan .................................. 57-200545

[51] Int. Cl.⁴ .......................... H01B 12/00; H01F 7/22
[52] U.S. Cl. .................................. 335/216; 174/15 S; 336/60; 336/229; 336/DIG. 1
[58] Field of Search .................. 174/15 C, 15 S, 16 B; 335/216; 336/DIG. 1, 60, 229

[56] References Cited

U.S. PATENT DOCUMENTS

| 3,354,261 | 11/1967 | Polgov | 174/16 B |
| 4,242,534 | 12/1980 | Marsing | 174/15 S |
| 4,409,431 | 10/1983 | Neuroth | 174/103 |

FOREIGN PATENT DOCUMENTS

| 2602728 | 6/1977 | Fed. Rep. of Germany | 174/15 S |
| 29310 | 3/1981 | Japan | 335/216 |

Primary Examiner—A. T. Grimley
Assistant Examiner—Morris H. Nimmo
Attorney, Agent, or Firm—Cushman, Darby & Cushman

[57] ABSTRACT

A forced-cooled superconductor wherein a plurality of superconducting wires are placed within a hollow stabilizer of substantially rectangular section; and a first passage for passing a coolant is longitudinally formed between the stabilizer and a casing encasing the stabilizer, the stabilizer having a plurality of second passages formed therethrough for flowing the coolant from the first passage to the inside of the stabilizer so that the coolant flows through the second passages into the space defined between the superconducting wires for direct cooling. The stabilizer includes a pair of channel members opposedly fitted together to form into a substantially rectangular tube.

7 Claims, 14 Drawing Figures

FORCED-COOLED SUPERCONDUCTOR

BACKGROUND OF THE INVENTION

The present invention relates to a superconductor used in superconducting magnets for nuclear fusion research and the like, and in particular relates to a superconductor of a type forced cooled with a coolant.

Figure 1:
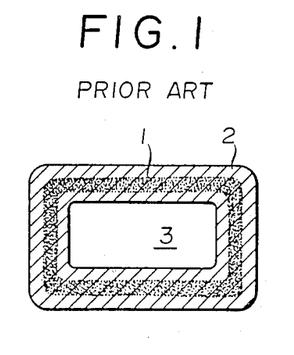
FIG. 1 illustrates a cross section of a typical example of a prior art hollow superconductor.
Figure 2:
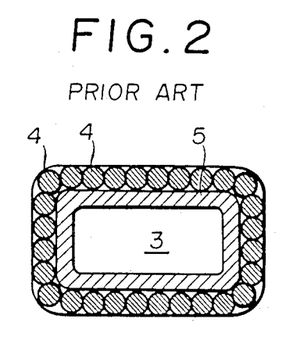
FIG. 2 illustrates a cross-sectional view of another example of a prior art hollow superconductor.
Figure 3:
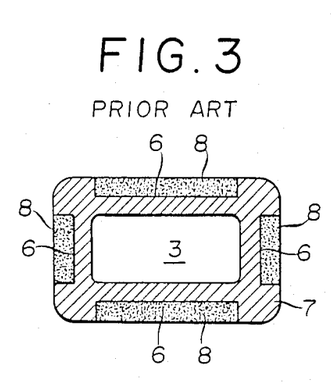
FIG. 3 shows a cross-sectional view of a further example of a prior art hollow superconductor.

Recently, there have been proposed various superconducting coils which use the so-called "hollow" superconductor provided along its center with a coolant channel through which a coolant such as supercritical helium is forced to circulate, so that the superconductor is forcedly cooled from the inside. Typical examples such hollow superconductors are shown in FIGS. 1 to 3. In FIG. 1, superconducting filaments 1 are embedded in the walls of a stabilized member 2 of a rectangular section, made of copper and the like, which has a coolant channel 3 centrally formed through it. FIG. 2 illustrates another type of superconductor in which extremely fine multi-filamentary superconducting wires 4 are wound or twisted around the outer faces of a stabilized member 5 of the same material as in FIG. 1. In another type of superconductor shown in FIG. 3, there are provided four grooves 6 longitudinally formed in the outer faces of the stabilized member 7. Braided and worked superconducting wires 8 are fitted into and soldered to the grooves 6.

Superconducting magnets utilizing superconductors of such forced cooled types are advantageous in that they are uniformly cooled by forcedly circulating a coolant in the superconductor, in that consumption of the coolant is relatively small, and in that the magnetic coil is compact and high in mechanical strength. However, in these superconducting magnets, the superconducting wires are indirectly cooled through the stabilizing member, and hence the efficiency of cooling is relatively low, which causes delay in recovery of superconducting state when it is lost due to a heat spot produced in the superconducting wires.

Figure 4:
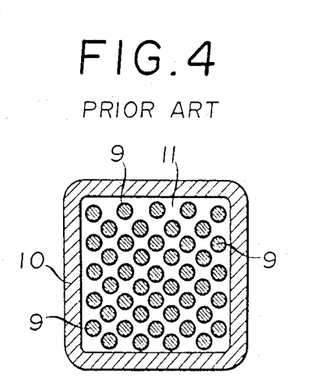
FIG. 4 illustrates a typical example of a prior art direct cooling type superconductor in a cross section.

On the other hand, there has been proposed the so-called "bundle" type superconductor, as shown in FIG. 4, in which a great number of superconducting wires 9 are inserted into a square tube 10 and a coolant such as liquid helium flows the space 11 between the wires. In this superconductor the coolant comes into direct contact with the surfaces of the wires 9 and thereby direct cooling is performed. However, it is rather difficult to make the coolant smoothly flow through the superconductor, and local stay of the coolant is hence produced, resulting in an increase in temperature, which can cause a heat spot to be produced or a delay in recovery of the superconducting state.

Figure 5:
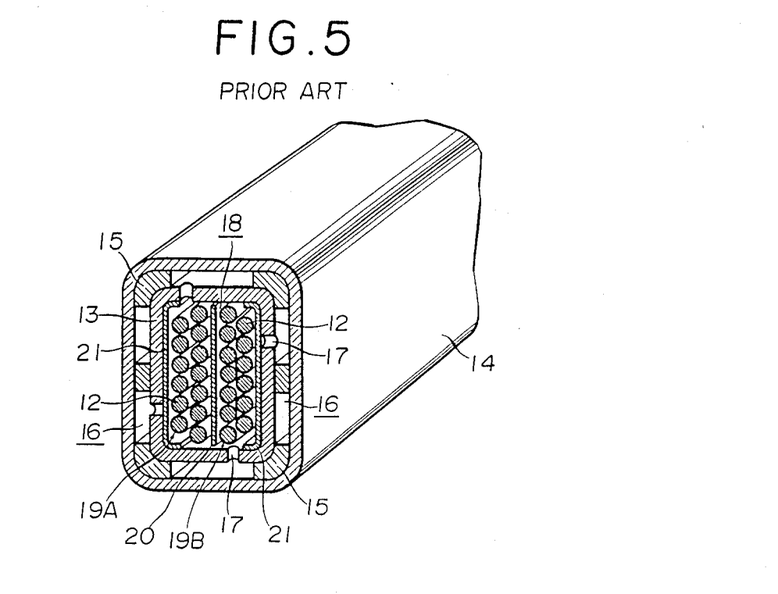
FIG. 5 is a perspective view partly in section showing a further typical example of a prior art superconductor.
Figure 6:
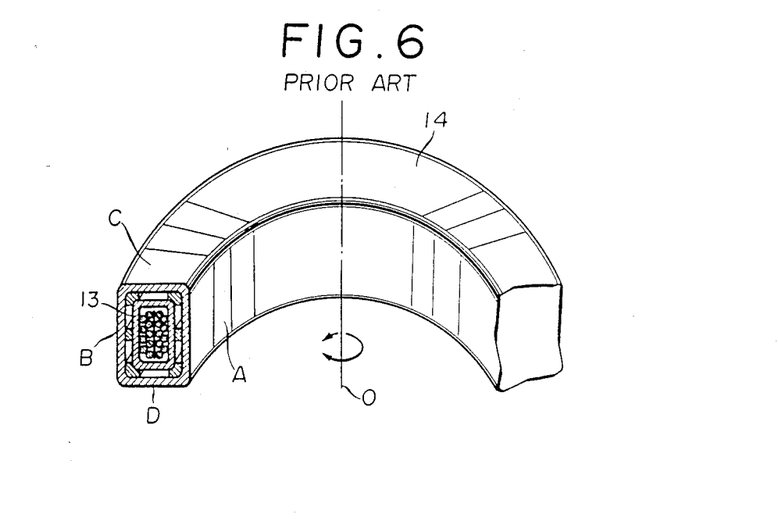
FIG. 6 is a fragmentary perspective view showing a prior art superconductor wound in a coil.

In view of the above, it has been proposed in Japanese patent application No. 57-45795 filed Mar. 23, 1982, now Japanese Published Application No. 58-162008 published on Sept. 26, 1983 a superconductor into which advantageous structures of the hollow superconductors and the direct cooling type superconductor shown in FIG. 5 are incorporated. This superconductor has a structure which is excellent in overall cooling efficiency and local stability, and is further capable of withstanding relatively large electromagnetic force.

FIG. 5 shows a typical example of this prior art superconductor, in which a large number of superconducting wires 12 are accommodated in a hollow stabilizing member 13 having a rectangular cross section and made of an electrically highly conductive material at the cryogenic temperature such as copper, copper alloy, high purity aluminum, aluminum alloy, etc. The superconducting wires 12 are made of a superconducting alloy material, such as Nb-Ti alloy and Nb-Ti-Ta alloy, or an intermetallic superconducting material such as $Nb_3Sn$, $V_3Ga$, $Nb_3Ge$, etc. The stabilizing member 13 is surrounded with a casing 14 of a rectangular tube made of copper, stainless steel, titanium alloy, etc. The stabilizing member 13 and the casing 14 are spaced by means of several separators 15 made of stainless steel or the same material as in the stabilizing member 13, and a coolant passage 16 is thereby formed between the stabilizing member 13 and the casing 14. The stabilizing member 13 has a plurality of passages 17 formed through it for flowing the coolant between the inside thereof and the coolant passage 16. The passages 16 may be in the form of a round hole, slot, slit or the like. A coolant, such as supercritical helium, which flows the coolant passages 16 passes through the passages 17 and enters into the space 18 formed between the superconducting wires 12 located inside the stabilizing member 13, where it comes into direct contact with the superconducting wires 12. Thus, a flow of the coolant is generated in the space 18 within the stabilizing member 13.

In the superconductor shown in FIG. 5, superconducting wire assemblies 19A and 19B consisting of a plurality of superconducting wires 12 are superposed with a thin tape 20 of a high resistance conductive material, such as cupronickel, interposed between them, and are accommodated in the stabilizing member 13. The tape 20 keeps the assemblies apart, and thereby prevents coupling current to flow between the assemblies, so that the deterioration in superconductivity characteristics of the superconductor at extremely high energizing speed, as in pulse drive, is prevented. Also, between each superconducting wire assembly and the stabilizing member 13, there is interposed a thin tape 21 similar to the tape 20. The tape 21 serves to prevent coupling current to flow the assemblies 19A and 19B through the stabilizing member 13. The tape 21 covering the superconducting wire assemblies 19A and 19B is provided with openings for allowing the coolant to pass through the passages 17 into the space 18 defined between the superconducting wires 12.

In this superconductor, the total cooling is carried out by a steady state flow of the coolant which flows the coolant passage 16, and thereby uniform cooling is carried out as in the previously-described prior art hollow superconductors. On the other hand, the direct cooling is made by bringing the coolant into direct contact with superconducting wires 12. Thus, this superconductor achieves fairly high cooling efficiency. It is to be noted that the coolant which flows outside and inside the atabilizing member is exchanged through the passages 17, and that there is hence little possibility of any heat spot is produced or the recovery of the superconducting state being delayed due to the local occurrence of a rise in temperature of the coolant as in the prior art direct-cooling-type superconductor in FIG. 4. Thus, the superconductor shown in FIG. 5 is superior also in stability in both the steady state and transient state. Further, this flow of the coolant through the passages 17 achieves sufficient cooling of the superconductor even when the superconducting wires have an assembly structure, such as a braided structure, which allows the coolant to flow less smoothly along the conductor. This fact gives less restriction to the design of the assembly structure of the superconducting wires. When in this superconductor the superconducting state is broken into the electrically normal conducting state due to a certain disturbance, part of the current flows into the stabilizing member, resulting in the production of heat. However, this heat of the stabilizing member is removed by the coolant which flows outside that member, and hence superconductor is capable of recovering the superconducting state soon as compared to the direct cooling system of the bundle type shown in FIG. 4. The superconductor is centrally provided with the superconducting wires, and hence when wound in a magnetic coil, it is less liable to be degraded in characteristics due to the bending stress.

The superconductor according to Japanese patent application No. 57-45795 is suitable for use in nuclear fusion reactors, electric machines, energy storage apparatus, magnetic resonance device, magnetic separation devices, etc., and particularly in large scale high magnetic field magnets. Further, it is particularly suitable for the superconductor carrying large pulse current.

Figure 7:
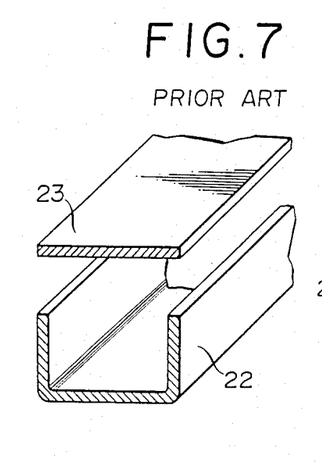
FIG. 7 is an exploded view of the stabilizing member of the prior art superconductor shown in FIG. 5.
Figure 8:
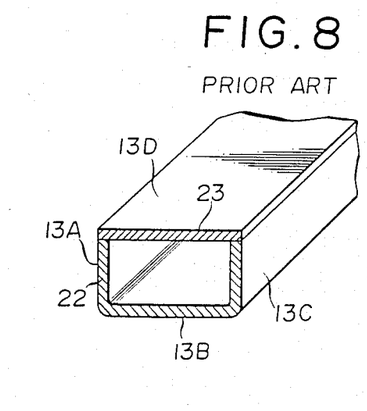
FIG. 8 is a perspective view of the stabilizing member of the prior art superconductor shown in FIG. 5.
Figure 9:
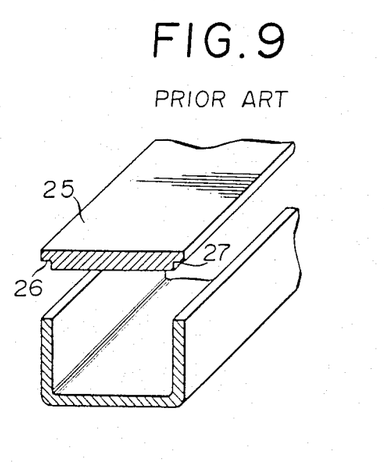
FIG. 9 is an exploded view of another stabilizing member used in the prior art superconductor of FIG. 5.
Figure 10:
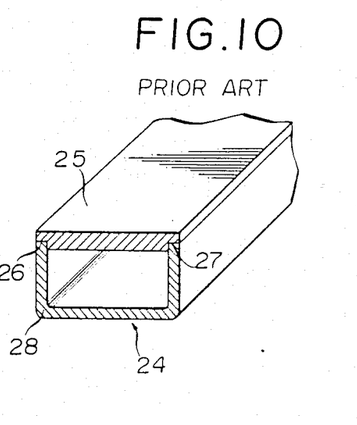
FIG. 10 illustrates a perspective view assembled view of the prior art stabilizing member shown in FIG. 9.

However, in developing this superconductor for practical use, the inventors have found that it has disadvantages described below. Ordinarily, this kind of superconductor is wound in the shape of a coil into a superconducting magnet so that the edgewise sides C and D thereof are placed perpendicularly to the central axis O. The stabilizing member 13 is rather thick, and hence this superconductor is as a whole high in rigidity. Thus, it is rather difficult to wind it in a coil. In practice, the stabilizing member 13, as shown in FIGS. 7 and 8, consists of a channel member 22 and a planar member 23 fixedly fitted to the channel member 22, the channel member 22 forming the three sides 13A, 13B and 13C, and the planar member 23 the other flatwise side 13D. The planar member 23 is fixed to the channel member 22 by spot welding its contact edges in order to prevent the planar member 23 from falling within the channel member in the winding of a coil, resulting in providing a damage to the superconducting wires. However, this spot welding is laborious and time-consuming, and further the spot welded portions can be separated when the stabilizing member is bent by any unduely large force in the coil winding. FIGS. 9 and 10 show a similar stabilizing member 24 which is different from the stabilizing member 13 in FIGS. 7 and 8 in fitting flanges 26 and 27 extending along the opposite edges of the planar member 25. The planar member 25 is fixed to the channel member 28 with the free ends of the channel member being fitted to the shoulders of the fitting flanges 26 and 27. Also in this case, the channel member 28 and the planar member 25 are put together by spot welding.

SUMMARY OF THE INVENTION

Accordingly, it is an object of the present invention to provide a forced-cooled superconductor which facilitates the winding of a coil.

It is another object of the present invention to provide a forced-cooled superconductor which makes the use of the spot welding unnecessary in fabricating the stabilizing member and thereby simplifies the manufacture thereof.

It is a still other object of the present invention to provide a forced-cooled superconductor which withstands a relatively large electromagnetic force in the radial direction when wound in a pancake coil, so that the superconducting wires incorporated therein are less liable to be damaged or deteriorated due to the deformation or collapse of the stabilizer by the radial electromagnetic force.

It is a further object of the present invention to provide a forced-cooled superconductor which eliminates the possibility of one component of the stabilizing member being dropped into the other component during the winding of a coil, and thereby the superconducting wires are prevented from being damaged by the dropped component.

With these and other objects in view, the present invention provides a forced-cooled superconductor wherein a plurality of superconducting wires are placed within a hollow stabilizer of substantially rectangular section; and a first passage for passing a coolant is longitudinally formed between the stabilizer and a casing encasing the stabilizer, the stabilizer having a plurality of second passages formed therethrough for flowing the coolant from the first passage to the inside of the stabilizer so that the coolant flows through the second passages into the space defined between the superconducting wires for direct cooling. The stabilizer includes a pair of channel members opposedly fitted together to form into a substantially rectangular tube.

DETAILED DESCRIPTION OF PREFERRED EMBODIMENTS

In the following description of the preferred embodiments of the present invention, reference is made to only the stabilizer of the superconductor since the structure and the members, except the stabilizer of the superconductor, disclosed in the aforementioned Japanese patent application No. 57-45795 are also adopted in the present invention.

Figure 11:
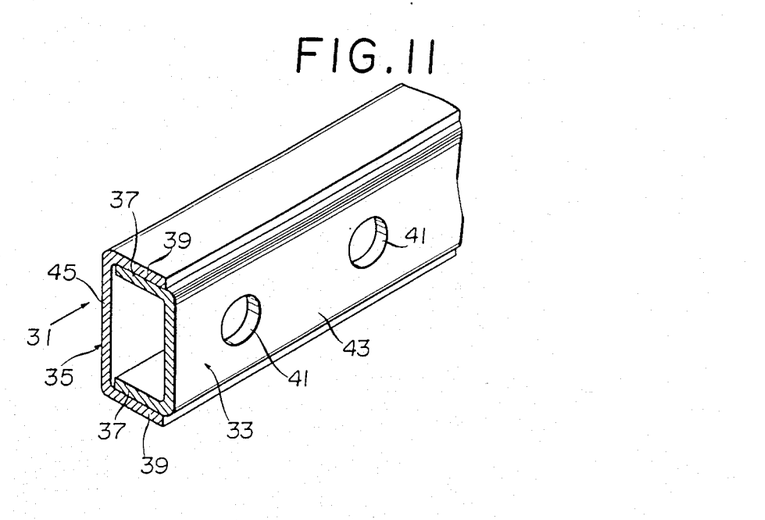
FIG. 11 illustrates a perspective view of a stabilizing member used in the superconductor according to the present invention.

FIG. 11 illustrates a stabilizer 31 used in the superconductor according to the present invention. The stabilizer consists of a pair of channel, members 33 and 35 having one channel member 33 opposingly fitted into the other channel member 35. The channel members 33 and 35 are merely fitted together without being fixed to one another by means of spot welding and the like. As in the Japanese patent application No. 57-45795 the channel members 33 and 35 have a plurality of passages 41 formed at predetermined intervals through webs 43 and 45 thereof for establishing communication between the inside and the outside of stabilizer 31. The passage 41 may be of a round through hole as in FIG. 11, a slit or other like configurations.

Figure 12:
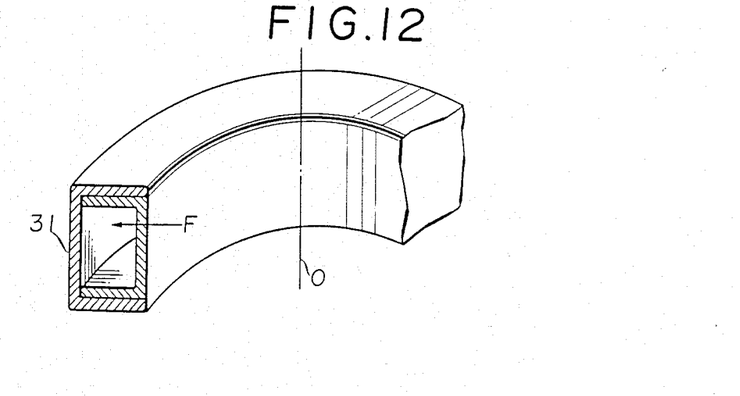
FIG. 12 illustrates a perspective view of the stabilizing member in FIG. 11 wound in a coil.

The channel members 33 and 35 are longitudinally slidable relative to each other since they are merely fitted together and not fixed to one another. Thus, when the superconductor using the stabilizing member 31 is wound in a coil, the relative sliding movement of the channel members 33 and 35 will compensate for the necessary extension of the diametrically outwardly positioned channel member, and thereby the winding of the superconductor around a reel is easily carried out. In this superconductor, there is no problem, as in the superconductor shown in FIG. 8, in that one member 23 is dropped into the other 22 with the result that the superconducting wires 12 are damaged by the one member 23. Further, this superconductor makes spot welding unnecessary and hence the manufacture thereof is simplified. It is further to be noted that the flanges 37 and 37 of the one channel member 33 lie on the flanges 39 and 39 of the other 35 respectively, and thus the superconductor has double-walled upper and lower portions. When this superconductor is wound in the form of a pancake coil, the double-walled upper and lower portions thereof are, as shown in FIG. 12, located so as to be perpendicular to the central axis O of the coil and extend in radial planes. In this state the edge of each flange 37 of one channel member 33 abuts against the bottom of the other channel member 35. Therefore, the superconductor withstands fairly large electromagnetic force F which is radially applied to it when energized, and which tends to deform or collapse it, so that the superconducting wires encased in the stabilizer are effectively prevented from being damaged.

Figure 13:
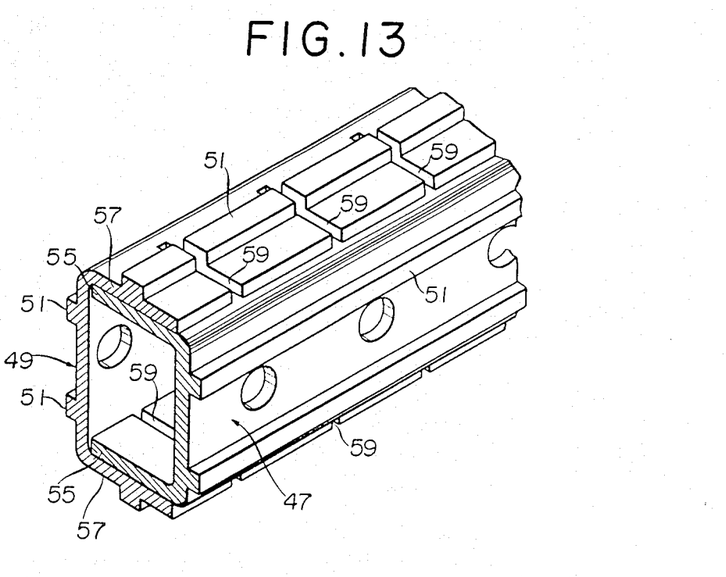
FIG. 13 shows a perspective view of a modified form of the stabilizer in FIG. 11.
Figure 14:
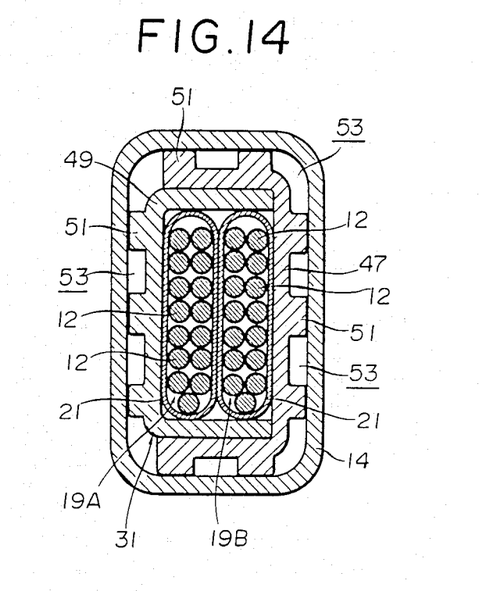
FIG. 14 illustrates a perspective view of the superconductor adopting a stabilizer constructed according to the present invention.

FIG. 13 illustrates a modified form of the stabilizer 31 shown in FIG. 11, in which a pair of the channel members 47 and 49 have a plurality of longitudinal ridges 51 formed integrally with their outer faces, the ridges being of a rectangular cross section. These ridges 51 correspond to the separators 15 shown in FIG. 5, and serve as shown in FIG. 14 to form coolant passages 53 between the stabilizer 31 and the casing 14. This superconductor does not need any separators 15, and hence the assembly thereof is largely simplified. The channel members 47 and 49 are further provided at their flanges 55 and 57 with a plurality of slits 59 formed transversely at predetermined intervals. These slits 59 make it easier to bend the superconductor in a coil, so that the coiling of the superconductor is facilitated. Thus, large-scale superconducting magnets which can generate high magnetic field of the order of 10 to 12T can be easily built.

Those skilled in the art will gain a further and better understanding of this invention from the following illustrative, but not limiting, example of the forced-cooled superconductor of this invention.

EXAMPLE

There were prepared superconducting wires including 7735 $Nb_3Sn$ filaments each having a cross-sectional ratio of copper to non-copper components being 0.83 and a niobium diffusion barrier. All these wires were subjected to twisting and diameter reduction to form a primary conductor of 1.4 mm diameter. Fifteen primary conductors were prepared in this manner and stranded to form a secondary conductor with a strand pitch of 100 mm.

On the other hand, a stabilizer similar to that shown in FIG. 13 was prepared in the following manner. An oxygen free copper tape 3.5 mm thick and 31.0 mm wide was rolled to produce a first deformed tape 1.0 mm thick and 31.0 mm wide, having seven ridges 1.5 mm in height formed, at predetermined intervals, integrally with one surface thereof. Similarly, a second deformed oxygen free copper tape 27 mm wide and 1.0 mm thick having the same three ridges formed, at predetermined intervals, integrally with the central portion of one face thereof. The first and the second tapes were formed into channel members so as to be fitted together to form a stabilizer shown in FIG. 14. This stabilizer was provided by die-cutting at their flanges with slits 2 mm in width formed at an interval of 10 mm and at their webs with a great number of pass through holes 41.

Two secondary conductors were prepared in the above-described manner and each wound with a cupronickel tape 0.1 mm thick and 20 mm wide having appropriate holes for allowing a coolant to flow into the secondary conductor. Thereafter, these two secondary conductors each consisting of 15 primary conductors and covered with the cupronickel tape were continuously inserted in two layers into the stabilizer composed of the two channel tapes to form a third conductor, which was then introduced into a casing of oxygen free copper during the continuous welding of the casing. This casing was thereafter subjected to diameter reduction by means of a roll and die to thereby produce a fourth conductor of a rectangular cross-section 13 mm×23 mm and of more than 100 m length. The completed conductor is illustrated in an enlarged cross-sectional view in FIG. 14.

The thus-produced fourth conductor was electrically insulated with a silica, quartz or alumina glass tape and then wound into a coil having an inner diameter 300 mm, outer diameter 600 mm and height about 50 mm. Eight coils were prepared in this manner and subjected to heat diffusion respectively at the atmosphere of nitrogen gas at 800° C. for 50 hours to form $Nb_3Sn$. Then, a forced-cooled superconducting magnet was built by piling these eight coils.

The superconducting magnet thus prepared was tested under forced cooling in combination with an outer magnet which generated a magnetic field of 5T. The cooling was carried out by circulating supercritical helium through the inside of the superconductor. It was noted that the magnet carried a current of 18,000 A at 5.5 K in a central magnetic field of 10T. In view of the fact that a superconducting wire (the primary conductor) of 1.4 mm diameter carries a critical current of 920A at 4.2 K in a central magnetic field of 10T, this results show that the magnet had little degradation in the superconductivity due to the coiling, and exhibited excellent characteristics.

What is claimed is:

1. In a force-cooled superconductor of the type including an elongated stabilizer defining a longitudinal axis and having a hollow cavity of substantially rectangular cross-section; a plurality of superconducting wires housed within the hollow cavity of said stabilizer, adjacent ones of said superconducting wires defining a space therebetween; a casing defining inner faces which establish an inner region, said stabilizer being disposed in said inner region and encased by said casing, and a first passageway defined between said stabilizer and said inner faces of said casing to permit passage of a coolant therethrough, said stabilizer having means defining a plurality of second passageways for permitting the coolant to flow from said first passageway to the hollow cavity of said stabilizer so that the coolant flows through the second passageways and into the spaced defined between adjacent ones of said superconducting wires for direct cooling thereof, the improvement wherein said stabilizer comprises:

a pair of channel members, each said channel member including a pair of spaced-apart flanges and a web member interconnecting the flanges, at least one flange of one of said pair of channel members being interdigitated with the other one of said pair of channel members to thereby establish said hollow cavity, wherein each said channel member includes means defining plural integral ridges oriented substantially parallel to said longitudinal axis, each said ridge having an outer surface directly adjacent to and in engagement with a respective inner face on said casing for interiorly spacing said channel member from said casing; and wherein each said flange of said pair of channel members includes means defining plural slits, adjacent ones of said slits being spaced-apart relative to said longitudinal axis, each said slit having an open end formed at an edge of said flange and a closed end laterally spaced from said web member, said slit being defined between said open and closed ends and oriented transversely relative to said longitudinal axis to thereby permit bending of said stabilizer about a bending axis perpendicular to said longitudinal axis.

2. A superconductor as recited in claim 1, wherein said ridge defining means defines plural ridges each having a rectangular cross-section.

3. A superconductor as in claim 1 wherein said ridges are defined between adjacent ones of said slits.

4. A superconductor as in claim 3 wherein said ridges extend from one slit to the immediately adjacent slit such that said slits extend transversely beyond said ridges toward said web member.

5. A superconductor as in claim 1 further comprising separating means for separating said superconducting wires into a plurality of groups, said separating means defining openings to permit the coolant to pass therethrough.

6. A superconductor as in claim 5 wherein said separating means includes a conductive tape wound around each of said groups.

7. A superconducting magnet having a central axis and comprising a forced-cooled superconductor of the type including an elongated stabilizer defining a longitudinal axis and having a hollow cavity of substantially rectangular cross-section, plural superconducting wires housed within said hollow cavity of said stabilizer, adjacent ones of said superconducting wires defining a space therebetween, a casing defining inner faces to establish an inner region, said stabilizer being disposed in said inner region and encased by said casing, and a first passageway defined between said stabilizer and said inner faces of said casing to permit passage of a coolant therethrough, said stabilizer having means defining a plurality of second passageways for permitting the coolant to flow from said first passageway to the hollow cavity of said stabilizer so that the coolant flows through said second passageways and into the space defined between adjacent ones of said superconducting wires for direct cooling thereof, said stabilizer including:

a pair of channel members, each said channel member including a pair of spaced-apart flanges and a web member interconnecting said pair of flanges, at least one flange of one of said pair of channel members being interdigitated with the other one of said pair of channel members to thereby establish said hollow cavity, wherein each said channel member includes means defining plural integral ridges oriented substantially parallel to said longitudinal axis, each said ridge having an outer surface directly adjacent to and in engagement with a respective inner face of said casing for interiorly spacing said channel member from said casing, wherein each said flange of said pair of channel members includes means defining plural slits, adjacent ones of said slits being spaced-apart relative to said longitudinal axis, each said slit having an open end formed at an edge of said flange and a closed end laterally spaced from said web member, said slit being defined between said open and closed ends and oriented transversely relative to said longitudinal axis, and wherein said superconductor is wound in the shape of a coil with said flanges of said pair of channel members being oriented perpendicularly to said central axis of said superconducting magnet.

* * * * *